July 2, 1968   R. P. SYRE ET AL   3,390,564
METHOD OF FORMING METAL ELEMENTS
Filed May 25, 1965
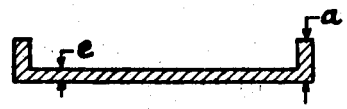
—Fig. 1—
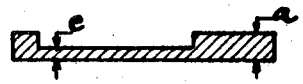
—Fig. 2—
—Fig. 3—
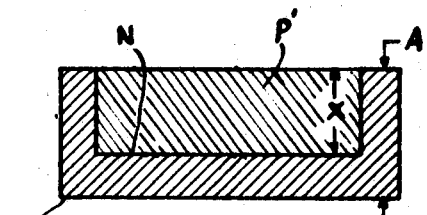
—Fig. 4—
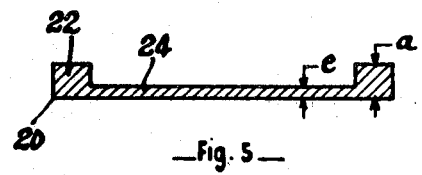
—Fig. 5—
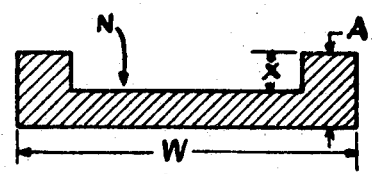
—Fig. 6—
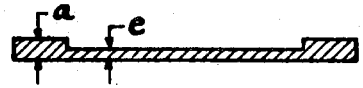
—Fig. 7—
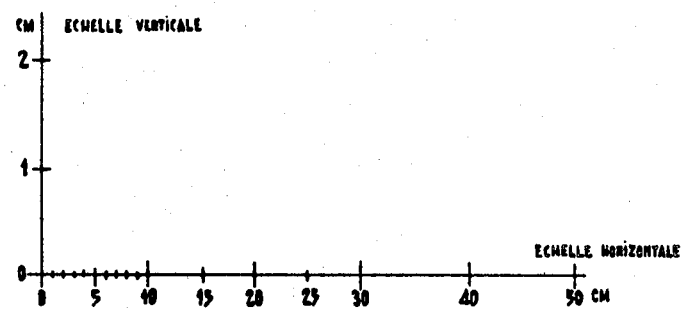
INVENTORS
Robert P. Syre
BY  Jean L. Mercier
McDougall, Hersh & Scott
Attys United States Patent Office 3,390,564
Patented July 2, 1968

3,390,564
METHOD OF FORMING METAL ELEMENTS
Robert P. Syre, Cognin, and Jean L. Mercier, Fonchoma Issoire, France, assignors to Pechiney, Compagnie de Produits Chimiques et Electrometallurgiques
Filed May 25, 1965, Ser. No. 458,688
Claims priority, application France, June 3, 1964, 976,908
5 Claims. (Cl. 72—363)

ABSTRACT OF THE DISCLOSURE

The production of sheets of light metals and alloys adapted to be joined by welding in the manufacture of welded structures in which the sheets are formed in cross-section with the weld edge portions of greater thickness than the remainder and comprising providing a plate of the metal having a width corresponding to the width of the sheet and a thickness greater than the thickness of the weld edge of the sheet and having a notched portion throughout the length of the plate dimensioned to have a width corresponding to the width of the sheet between the weld edge portions and a depth corresponding to $$X = A \times \frac{a-e}{a}$$

in which X is the depth of the notch, A is the thickness of the plate, $a$ is the thickness of the small weld edge of the sheet and $e$ the thickness of the thinner portions between the weld edges, filling the notch with an insert dimensioned to correspond to the dimension of the notch and formed of a metal having elongation properties similar to those of the metal of which the plate is formed, reducing the assembly by passing between reducing rolls until the assembly is reduced to the thickness of the weld edge and then removing the insert from within the resulting sheet and in which a separating compound separates the surface of the insert from the metal to prevent interbonding.

---

This invention relates to the art of welding light metals and alloys of light metals and it relates more particularly to the welding of relatively thin sheets or strips of such metals as aluminum or magnesium and alloys thereof and to the means and method for the preparation of such sheets or strips for joinder by welding.

It is an object of this invention to provide a method and means for the welding of light metals and alloys of light metals for joinder without development of a line of weakness along the weld thereby to maintain the level of strength and other mechanical properties through the cross-section of the entire welded element, and it is a related object to provide a method for the preparation of the parts to be welded for the purpose of achieving the desired effect in the welded joint.

More specifically, it is an object of this invention to provide a method and means for the joinder of sheets or strips of aluminum or magnesium or alloys thereof by welding in a manner to maintain the strength and other mechanical properties of the sheet or strip and it is a related object to provide a method for the preparation of such sheets or strips for welding.

These and other objects and advantages of this invention will hereinafter appear and for purposes of illustration, but not of limitation, embodiments of the invention are shown in the accompanying drawing, in which:

FIGS. 1, 2 and 3 are sectional elevational views through metal sheets embodying the features of this invention;

FIG. 4 is a sectional elevational view of an assembly of elements for use in processing to form a welded sheet embodying the features of this invention;

FIG. 5 is a sectional elevational view of the sheet formed by the processing of the assembly of FIG. 4;

FIG. 6 is a sectional elevational view of an original element for processing into a sheet of this invention; and FIG. 7 is a sectional elevational view of a sheet produced from the assembly of FIG. 6.

It is known that cold drawn or heat treated sheets or strips of such light metals as aluminum, magnesium and alloys thereof are reduced in their mechanical characteristics during welding by reason of the loss of the effect of cold drawing or heat treatment along the weld zone. In accordance with the practice of this invention, the described loss in mechanical characteristics is effectively compensated to produce a joinder of parts without greater weakness along the weld, by comparison with the remainder of the structure, by formation of the part with sections of greater thickness than the remainder along the weld edge. The increase in thickness in the weld zone makes it possible to compensate for losses in strength and other mechanical properties and to obtain resistance to rupture equivalent to that of the thinner portions available in the non-welded areas of the sheet. The use of sheets or strips with thicker weld edges enables the thickness $e$ to be defined by the usual calculations, taking into account the maximum characteristics of the cold drawn or heat treated metal, and to limit to the welded joints the supplementary thickness calculated to compensate for the decrease in the characteristics as a result of the welding operation. This permits an important saving in weight of the overall sheet by comparison with a sheet formed of the same thickness throughout the cross-section selected for the strength desired as a minimum at the weld edge.

The method of this invention is particularly useful for the fabrication of welded parts which are subjected to mechanical stresses, such for example as large tanks wherein the material cost is greatly reduced by the possibility of using thin sheets; tubular tanks or holders for gas under pressure in which, in the practice of this invention, the cylindrical body is constructed by helically winding a strip having the thicker edges of this invention and by welding the strips one to the other along their abutting thick edges. This permits the tank or holder to be constructed of sheets, the major portions of which are of minimum thickness thereby to enable the amount of metal forming the tank to be considerably reduced.

Sheets or strips having the desired increase in thickness at the weld edges cannot be formed by conventional drawing or rolling techniques because such conventional techniques do not permit wide variations in cross-section over a considerable length or width or in sheets of such small thickness as 1 mm.

An important concept of this invention resides in the method for preparation of sheets or strips of thin cross-section throughout the major body portion and with thicker edges by conventional rolling mill operations in a reduction process which makes use of rolling techniques.

For this purpose, as a starting material, use is made of plate P of rectangular cross-section having a width W corresponding to the element, such as the sheet or strip to be produced, but in which the thickness A is much greater than the thickness "$a$" sought to be secured in the lateral edges forming the weld sections.

The plate P is formed with a notched portion N having a width corresponding to the width of the sheet or strip between the thickened ends A and a depth which responds to the equation $$X = A \times \frac{a-e}{a}$$

in which $a$ is the thickness of the weld edges and $e$ the thickness in the central part of the sheet between the weld edges.

Use is made of an insert P′ dimensioned to be received in fitting relationship within said notch and dimensioned to have a length corresponding to the length of the plate P, a width corresponding to that of the width of the notch, and a thickness corresponding to the depth X of the notch. The plate P is formed of metal having elongation properties similar to that of the metal forming the plate and preferably the insert is formed of the same metal as the plate. In use, the insert P is positioned within the notch completely to fill the notch with a separating compound in between to prevent interbonding during the subsequent rolling operation.

The assembly is processed as though it were a solid integral plate by passing back and forth between conventional rolls to effect rolling reduction in cross-sectional area with the rolling process preferably being carried out first with the metal heated to an elevated temperature, in a hot rolling step, and then with the metal at a colder temperature, in a cold rolling step, with intermediate annealing, if necessary. The rolling is continued until a sheet or strip having a thickness $a$ is secured. In order to minimize the possibility of separation between the insert and the plate during the rolling operations, use can be made of a plate covering sheet coated with an anti-welding material for positioning between the upper surface of the plate and the rolls.

When the assembly has been reduced to the desired rolling thickness, the insert is removed, as by pulling. The resulting rolled sheet may be subjected to the usual heat treatment for the particular metal being used.

The sheet is then ready for joinder by welding but the external and internal edges can, if desirable, be further finished by continuous milling.

In order to obviate welding of the insert to the plate, the metal surfaces of one or the other or both of the plate P or insert P′ can be coated with a metal which is deposited by electrolytic means, oxides or silicates deposited by spraying, or organic products which yield carbonaceous residues by pyrolysis at the temperature to which the metal is heated for rolling. However, it is preferred to make use of products which contain powdered graphite or colloidal graphite in suspension, such as a graphitized heavy oil or graphitized grease which can be applied by brush coating or by a doctor roll, or graphite powders suspended in various liquids which can be applied by spray coating. It is also possible to make use of special well known anti-welding inks which can be applied by a doctor roll or by spraying.

The following examples are given by way of illustration but not by way of limitation of the processing of a plate to produce weld sheets embodying the features of this invention:

Example I

In the manufacture of a strip of aluminum having a purity of 99.5% and dimensioned to have a width of 320 mm., a thickness $e$ in the body portion of 1.15 mm. and a thickness $a$ of 2 mm. over a width of 35 mm. along the edges, use is made of an aluminum plate having a width of 320 mm., a thickness of 120 mm. and a length of 500 mm. The plate is formed with a notch or slot through its entire length having a width of 250 mm. and a depth X of 51 mm. with intact edges having a width of 35 mm., as illustrated in FIG. 4.

The entire surface defined by the notch is spray coated with a colloidal suspension of commercial graphite.

An aluminum insert P′ of identical quality as the metal forming the plate is provided having a width of 250 mm., a length of 500 mm. and a thickness of 51 mm. The surfaces of the insert P′ are also coated with a graphite suspension and then inserted into the notch, as illustrated in FIG. 4. The assembly is heated for two hours at 450° C. and passed lengthwise between rolls of a reversible Duo rolling mill until the assembly is reduced in dimension to 320 × 7500 × 8. The temperature at the end of the rolling operation is reduced to about 250° C. and the assembly is cold rolled by passing lengthwise between rolls of a Quarto rolling mill for reduction to a thickness of 2.0 mm. and a resulting length of 19 meters.

Insert P′ is thereafter removed, as by pulling, to leave a sheet 20 having lateral thick edges 22 and a thin central section 24, as illustrated in FIG. 5.

The sheet can be used in the manufacture of a tubular holder by helically winding the sheet and joinder of the abutting thick edges by welding. The welding effect, occurring only between the thick edges, provides a welded part having a mechanical resistance at least equivalent to that of the non-welded central portion of the sheet of lesser thickness.

By comparison, if a tank of the same mechanical strength were fabricated from sheets of uniform thickness, it would have been necessary to make use of sheets having a thickness of 3 mm. throughout. This would require almost three times the amount of metal with corresponding increase in weight and cost.

Example 2

A plate of an aluminum alloy containing 3% by weight of magnesium and having a width of 320 mm. and a thickness of 70 mm. is machined as illustrated in FIG. 6 to provide a notch which is filled with an insert of the same alloy and which is processed in a rolling mill in accordance with the procedure of Example 1. The procedure, as regards the operation, includes reheating the assembly for two hours at 480° C., hot rolling lengthwise to a thickness of 6 mm.; annealing for two hours at 400° C.; cold rolling until the total thickness is reduced to 2 mm.; and stripping the insert from the rolled assembly. The result is a sheet having the configuration shown in FIG. 7.

In the formation of a hoop tank having a diameter of 5 feet, the sheets are vertically aligned and the abutting thicker edges $a$ are joined one to the other by welding. The savings in weight by comparison with a tank made by welding aluminum sheets of uniform thickness and having the desired mechanical strength in the weld sections is very considerable.

It will be apparent from the foregoing that we have provided a new and improved concept for the construction of elements formed of welded light metal such as aluminum and magnesium and alloys thereof whereby considerable savings can be made in weight and material by use of sheets embodying the described configurations and it will be also apparent that we have provided a new and improved concept with respect to the production of weldable elements of the type described.

It will be understood that changes may be made in the details of construction, arrangement and operation without departing from the spirit of the invention, especially as defined in the following claims.

We claim:
1. The method for producing sheets of light metals and alloys for joinder by welding in the manufacture of welded structures wherein the sheets are formed in cross-section with weld edge portions of greater thickness than the remainder, comprising forming a plate of the metal having a width corresponding to the width of the sheet, a thickness greater than the thickness of the weld edge portion of the sheet and with a notch formed throughout the length of the plate in the central portion thereof having a width corresponding to the width of the sheet between the weld edges and a depth corresponding to

$$X = A \times \frac{a-e}{a}$$

in which X is the depth of the notch, A is the thickness of the plate and $a$ is the thickness of the weld edge of the sheet and $e$ is the thickness of the thinner portions in between the weld edge portions of the sheet, filling the notch with an insert dimensioned to correspond with the notch and formed of a metal having elongation properties similar to the metal of the plate, separating surfaces between the insert and plate with a separating compound to prevent interbonding, reducing the assembly by passing the assembly lengthwise between reducing rolls until the assembly is reduced to the thickness $a$, and then separating the insert from within the resulting sheet.

2. The method as claimed in claim 1 in which the metal of the plate is selected from the group consisting of aluminum, magnesium and alloys thereof.

3. The method as claimed in claim 1 in which the metal of the insert is the same as the metal of the plate.

4. The method as claimed in claim 1 in which the rolling reduction of the assembly is carried out with a partial reduction with the metals heated to elevated temperature and for completion of the reduction in a cold rolling step.

5. The method as claimed in claim 4 which includes an annealing step intermediate the hot rolling and cold rolling steps.

References Cited
UNITED STATES PATENTS

| | | | |
|---|---|---|---|
| 2,386,091 | 10/1945 | Carlson | 29—423 |
| 2,960,763 | 11/1960 | Reichl | 29—423 |
| 3,150,445 | 9/1964 | Butt | 29—497.5 X |

JOHN F. CAMPBELL, *Primary Examiner.*

R. F. DROPKIN, *Assistant Examiner.*